(12) United States Patent
Abbas

(10) Patent No.: US 9,253,078 B2
(45) Date of Patent: *Feb. 2, 2016

(54) NETWORKS HAVING MULTIPLE PATHS BETWEEN NODES AND NODES FOR SUCH A NETWORK

(75) Inventor: Ghani Abbas, Nottinghamshire (GB)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 195 days.

This patent is subject to a terminal disclaimer.

(21) Appl. No.: 13/616,521

(22) Filed: Sep. 14, 2012

(65) Prior Publication Data

US 2013/0003536 A1     Jan. 3, 2013

Related U.S. Application Data

(63) Continuation of application No. 12/680,450, which is a continuation of application No. PCT/EP2007/061774, filed on Oct. 31, 2007, now Pat. No. 8,289,844.

(51) Int. Cl.
*H04L 12/729* (2013.01)
*H04L 12/54* (2013.01)
*H04L 12/751* (2013.01)
*H04L 12/721* (2013.01)
(Continued)

(52) U.S. Cl.
CPC .......... *H04L 45/125* (2013.01); *H04L 12/5602* (2013.01); *H04L 45/02* (2013.01); *H04L 45/14* (2013.01); *H04L 45/24* (2013.01); *H04L 47/125* (2013.01)

(58) Field of Classification Search
CPC ............ H04L 41/0654–41/0672; H04L 45/22; H04L 45/24; H04L 45/28; H04L 47/12; H04L 47/122; H04L 47/125
USPC .................................. 370/216–228, 466, 468
See application file for complete search history.

(56) References Cited

U.S. PATENT DOCUMENTS

| 5,920,705 | A | | 7/1999 | Lyon et al. |
| 6,112,249 | A | * | 8/2000 | Bader et al. ................... 709/239 |

(Continued)

FOREIGN PATENT DOCUMENTS

| CN | 1913414 A | 2/2007 |
| JP | H05-167619 A | 7/1993 |

(Continued)

OTHER PUBLICATIONS

ITU-T Telecommunication Standardization Sector of ITU. Generic protection switching—Linear trail and subnetwork protection. G.808.1 (Mar. 2006).

(Continued)

*Primary Examiner* — Pao Sinkantarakorn

(57) ABSTRACT

A method of operating a network that contains a plurality of nodes is disclosed. The plurality of nodes include a first node and a second node with the first and second nodes being connected via a first path and a second path that are different. The method includes operating the network in first and second modes of operation. In the first mode, traffic between the first and second nodes is transmitted over the first path and not the second path. In the second mode, traffic is transmitted over the first and second paths. The mode of operation is selected based upon a level of traffic between the first and second nodes.

14 Claims, 1 Drawing Sheet

(51) Int. Cl.
*H04L 12/707* (2013.01)
*H04L 12/803* (2013.01)

(56) References Cited

U.S. PATENT DOCUMENTS

| | | | |
|---|---|---|---|
| 6,738,352 | B1 | 5/2004 | Yamada et al. |
| 7,773,526 | B2 | 8/2010 | Abe |
| 2002/0071391 | A1 | 6/2002 | Ishioka |
| 2002/0196735 | A1 | 12/2002 | Hayes |
| 2003/0216141 | A1 | 11/2003 | Antoniou et al. |
| 2004/0032856 | A1* | 2/2004 | Sandstrom ............... 370/351 |
| 2004/0213149 | A1* | 10/2004 | Mascolo ................. 370/229 |
| 2004/0218582 | A1 | 11/2004 | Kennedy et al. |
| 2005/0135235 | A1 | 6/2005 | Maruyama et al. |
| 2005/0243713 | A1 | 11/2005 | Okuda |
| 2005/0243723 | A1 | 11/2005 | Randriamasy |
| 2006/0291381 | A1* | 12/2006 | Weedmark et al. ....... 370/228 |
| 2007/0076727 | A1 | 4/2007 | Shei |
| 2007/0127509 | A1 | 6/2007 | Lin |
| 2011/0194405 | A1 | 8/2011 | Abbas |
| 2013/0003536 | A1 | 1/2013 | Abbas |

FOREIGN PATENT DOCUMENTS

| | | |
|---|---|---|
| JP | H10-301870 A | 11/1998 |
| JP | 2000-253058 A | 9/2000 |
| JP | 2002-135323 | 5/2002 |
| JP | 2002-176441 A | 6/2002 |
| JP | 2003-143201 A | 5/2003 |
| JP | 2007-067906 A | 3/2007 |
| JP | 2007-208930 | 8/2007 |
| KR | 10-2004-0047234 | 6/2004 |

OTHER PUBLICATIONS

Zongyu, et al.: "Optical Fiber Access Network Technology and Applications thereof". ISBN 7-115-07424-0/TN 1420, pp. 61-62. Year: 1998.

Jijun, et al.: "New Generation Metropolitan Area Optical Transmission Technology". ISBN 7-5635-1110-8/TN 383; pp. 178-181, Year: 2005.

Pingping, et al.: "SDH Theory and Technology". ISBN 978-7-5635-0568-5/TN 260; pp. 72-75, Year: 2002.

* cited by examiner

NETWORKS HAVING MULTIPLE PATHS BETWEEN NODES AND NODES FOR SUCH A NETWORK

CROSS-REFERENCE TO RELATED APPLICATIONS

This application is a continuation of International Application PCT/EP2007/061774 with an international filing date of 31 Oct. 2007, which corresponds to the national-stage entry U.S. application Ser. No. 12/680,450, filed 1 Nov. 2010 now U.S. Pat. No. 8,289,844, the disclosures of which are incorporated herein by reference.

TECHNICAL FIELD

This invention relates to a network, a network node, and a method of operating a network, in which at least two paths are provided between two nodes of the network.

BACKGROUND

Network communication is well known. In a network, it is often desired to transmit traffic from a source node to a destination node across the network. To ensure the reliability of communication between such pairs of nodes, it is known to provide protection for communication channels.

In such a scheme, a primary connection through the network is established. A protection connection is also established taking a different path through the network. The protection connection is not, in normal use used. It only comes into action should the primary connection fail due to loss of signal, loss of continuity, increased error rate, dropped frames or so on.

A single protection connection may be dedicated to a particular primary connection (1:1 protection) or may be shared between multiple primary connections (1:n protection) depending upon how important it is that a given connection is maintained. Such protection schemes are described in the International Telecommunications Union (ITU) recommendations numbers G.808.1 and G841, the disclosures of which are hereby incorporated by reference.

SUMMARY

According to a first aspect of the invention, there is provided a network comprising a plurality of nodes, the plurality of nodes comprising a first node and a second node, the first and second nodes being connected through the network of nodes via first path and a second path, the first and second paths being different, in which the network has first and second modes of operation, a first mode in which traffic between the first and second nodes is transmitted over the first path and not the second path, and a second mode where the traffic is transmitted over the first and second paths, wherein the network comprises a mode selector arranged to select the mode of operation based upon a demanded level of traffic between the first and second nodes.

Accordingly, this can be seen as primarily using the first path to transmit data over, but only using the second path should that become necessary. In a particularly advantageous embodiment, the second path comprises a protection path such that the network has a third mode of operation in which traffic between the first and second nodes is sent over only the second path, and in which the mode selector is arranged to select this mode should there be a fault on the first path. By these means, known protection paths which would otherwise be idle can be used whilst there is not a fault, but be brought into play should a fault arise.

The first and second paths may be different; they may traverse different sets of intermediate nodes through the network. This is typical in protection paths.

The selection of the mode of operation dependent upon the demanded level of traffic may depend upon the rate at which data to be transmitted across the link is received. For example, a simple calculation of the rate at which data for the link are received could be employed. The mode selector may therefore comprise comparison means to compare the rate with a threshold; if the rate exceeds the threshold then the second mode of operation may be selected. The threshold may be a fraction of an available bandwidth of the first path, such as 80% or 100%, The network may further comprise a priority assignor, which is operable to assign a priority to the assignment of data between the first and second paths. Where the second path comprises a protection path, data for the protection path that is potentially to be routed onto the second path because of a failure in the network may have a higher priority than that assigned to data potentially to be assigned to the second path because of traffic levels. The first node is preferably arranged to assign data to the first or second paths dependent upon the priority assigned to the data.

According to a second aspect of the invention, there is provided a network node for use in sending data to a destination node in a network, the network node comprising a first network interface and a second network interface, in which the network node has first and second modes of operation, a first mode in which the network node transmits data for the destination using the first network interface and not the second network interface, and a second mode where the data for the destination node is transmitted over the first and second network interfaces, wherein the network node comprises a mode selector arranged to select the mode of operation based upon a demanded level of traffic for the destination node.

Again, this allows a secondary path to be selected should the traffic between the network node and the destination node require it. Typically, in use, the first network interface would be connected to a first path across the network to the destination node and the second network interface would be connected to a second path across the network to the destination node.

The network node may comprise a protection switch, whereby in case of a fault traffic for the destination node is sent via the second network interface should there be a fault on a link from the first interface to the destination node. In a particularly advantageous embodiment, the second path comprises a protection path such that the second mode of operation is selected should there be a fault in the first path. By these means, known protection paths which would otherwise be idle can be used whilst there is not a fault, but be brought into play should a fault arise.

The first and second paths may he different; they may traverse different sets of intermediate nodes through the network. This is typical in protection paths.

The selection of the mode of operation dependent upon the demanded level of traffic may depend upon the rate at which data to be transmitted across the link is received. For example, a simple calculation of the rate at which data for the link are received could be employed. The mode selector may therefore comprise comparison means to compare the rate with a threshold; if the rate exceeds the threshold then the second mode of operation may be selected. The threshold may be a fraction of an available bandwidth of the first path, such as 80% or 1.00%.

The network may further comprise a priority assignor, which is operable to assign a priority to the assignment of data between the first and second paths. Where the second path comprises a protection path, data for the protection path that is potentially to be routed onto the second path because of a failure in the network may have a higher priority than that assigned to data potentially assigned to the second path because of traffic levels. The first node is preferably arranged to assign data to the first or second paths dependent upon the priority assigned to the data.

According to a third aspect of the invention, there is provided a method of operating a network, the network comprising a plurality of nodes, the plurality of nodes comprising a first node and a second node, the first and second nodes being connected through the network of nodes via first path and a second path, the first and second paths being different, the method comprising the operation of the network in first and second modes of operation, a first mode in which traffic between the first and second nodes is transmitted over the first path and not the second path, and a second mode where the traffic is transmitted over the first and second paths, and wherein the mode of operation is selected based upon a level of traffic between the first and second nodes.

Accordingly, this can be seen as primarily using the first path to transmit data over, but only using the second path should that become necessary. In a particularly advantageous embodiment, the second path comprises a protection path such that the network is operated in a third mode of operation in which traffic between the first and second nodes is sent over only the second path, and in which the third mode is selected should there be a fault on the first path. By these means, known protection paths which would otherwise be idle can be used whilst there is not a fault, but be brought into play should a fault arise.

The first and second paths may be different; they may traverse different sets of intermediate nodes through the network. This is typical in protection paths.

The selection of the mode of operation dependent upon the demanded level of traffic may depend upon the rate at which data to be transmitted across the link is received. For example, a simple calculation of the rate at which data for the link are received could be employed. The mode selector may therefore comprise comparison means to compare the rate with a threshold; if the rate exceeds the threshold then the second mode of operation may be selected. The threshold may be a fraction of an available bandwidth of the first path, such as 80% or 100%.

The method may comprise the step of assigning a priority to the assignment of data between the first and second paths. Where the second path comprises a protection path, data for the protection path that is potentially to be routed onto the second path because of a failure in the network may have a higher priority than that assigned to data potentially assigned to the second path because of traffic levels. Data is preferably assigned to the first or second paths dependent upon the priority assigned to the data.

According to a fourth aspect of the invention, there is provided a method of operating a network node so as to send data to a destination node in a network, the network node comprising a first network interface and a second network interface, in which the method comprises operating the network node in first and second modes of operation: a first mode in which the network node transmits data for the destination using the first network interface and not the second network interface, and a second mode where the data for the destination node is transmitted over the first and second network interfaces, and wherein the mode is selected based upon a level of traffic for the destination node.

Again, this allows a secondary path to be selected should the traffic between the network node and the destination node require it. Typically, in use, the first network interface would be connected to a first path across the network to the destination node and the second network interface would be connected to a second path across the network to the destination node.

The network node may comprise a protection switch, whereby in case of a fault traffic for the destination node is sent via the second network interface should there be a fault on a link from the first interface to the destination node. In a particularly advantageous embodiment, the second path comprises a protection path such that the second mode of operation is selected should there be a fault in the first path. By these means, known protection paths which would otherwise be idle can be used whilst there is not a fault, but be brought into play should a fault arise.

The first and second paths may be different; they may traverse different sets of intermediate nodes through the network. This is typical in protection paths.

The selection of the mode of operation dependent upon the demanded level of traffic may depend upon the rate at which data to be transmitted across the link is received. For example, a simple calculation of the rate at which data for the link are received could be employed. The mode selector may therefore comprise comparison means to compare the rate with a threshold; if the rate exceeds the threshold then the second mode of operation may be selected. The threshold may be a fraction of an available bandwidth of the first path, such as 80% or 100%.

The method may further comprise the assignment of a priority to the assignment of data between the first and second paths. Where the second path comprises a protection path, data for the protection path that is potentially to be routed onto the second path because of a failure in the network may have a higher priority than that assigned to data potentially assigned to the second path because of traffic levels. The first node is preferably arranged to assign data to the first or second paths dependent upon the priority assigned to the data.

Any of the nodes of any of the aspects of the invention may comprise a plurality of interfaces and associated equipment. The interfaces of the node may comprise both customer or network-facing interfaces, and the network interfaces referred to above may refer to any or all of such interfaces. Such interfaces may represent ingress or egress interfaces into or from the network. The interfaces may also be connected to further networks, for network interconnection.

The behaviour of the mode selector, or the selection of a mode may be controllable from a network management device, which may be located remote to the network node. Such network management device may be arranged to selectively disable the operation of the second mode, so that the operator of a network can cause the network, node or method to revert to the operation of prior art protection circuits.

DETAILED DESCRIPTION

Figure 1:
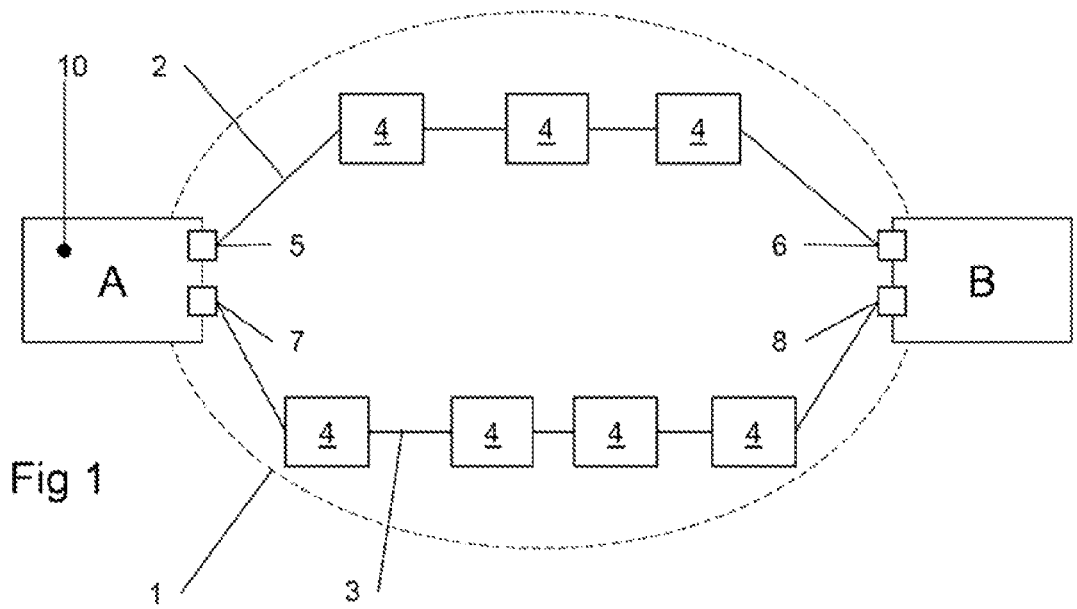
FIG. 1 shows schematic view of a network according to an embodiment of the invention.

A network according to an embodiment of the invention is shown in FIG. 1 of the accompanying drawings. This comprises two network nodes A and B connected via network 1. The nodes are connected by two paths, primary path 2 and secondary path 3. Each path 2, 3 comprises a plurality of intermediate nodes 4; the two paths 2, 3 are different in that they traverse different intermediate nodes. The primary path starts at a primary network interface 5 of node A and terminates at a primary network interface 6 of node B, whereas the secondary path starts at a secondary network interface 7 of node A and terminates at secondary network interface 8 of node B.

The nodes A and B may be connected by any of the following protocols: SDH/SONET, Ethernet, MPLS, or any packet based transmission protocol.

In a known network configuration, communication traffic for node B (as a destination node) from node A (as a source node) would generally be sent over the primary path 2 unless a fault developed on that path (for example if one of the intermediate nodes 4 or one of the primary network interfaces stopped functioning). In such a case, the traffic would be sent over secondary path 3 instead. In such a case the secondary path could be considered to be a protection path.

However, this embodiment of the invention relies upon the fact that, for most of the time, the secondary path will be unused and so represents an underutilisation of bandwidth. Accordingly, the secondary path is used once the bitrate of the traffic for node B at node A increases over a threshold. This makes use of the secondary path when there is not a fault, utilising otherwise unused bandwidth. This may be achieved by counting the number of data delivered to the primary network interface 5 at node A, and once a threshold is crossed, switching the data to the secondary path 3.

In order to ensure that a reasonable resiliency is still maintained, a high priority is assigned to protection against certain equipment (nodes or interfaces) having defects. Accordingly, the priority with which data is switched from the primary path 2 to the secondary path 3 may be set lower than if the primary path 2 were to fail. Such a priority may be implemented in line with an Automatic Protection Switching protocol such as are set out in ITU recommendations G.808.1 and G841. Such priority is not necessarily required in such a simple embodiment as that shown in FIG. 1 of the accompanying drawings, but the skilled man will appreciate its necessity in larger networks.

Figure 2:
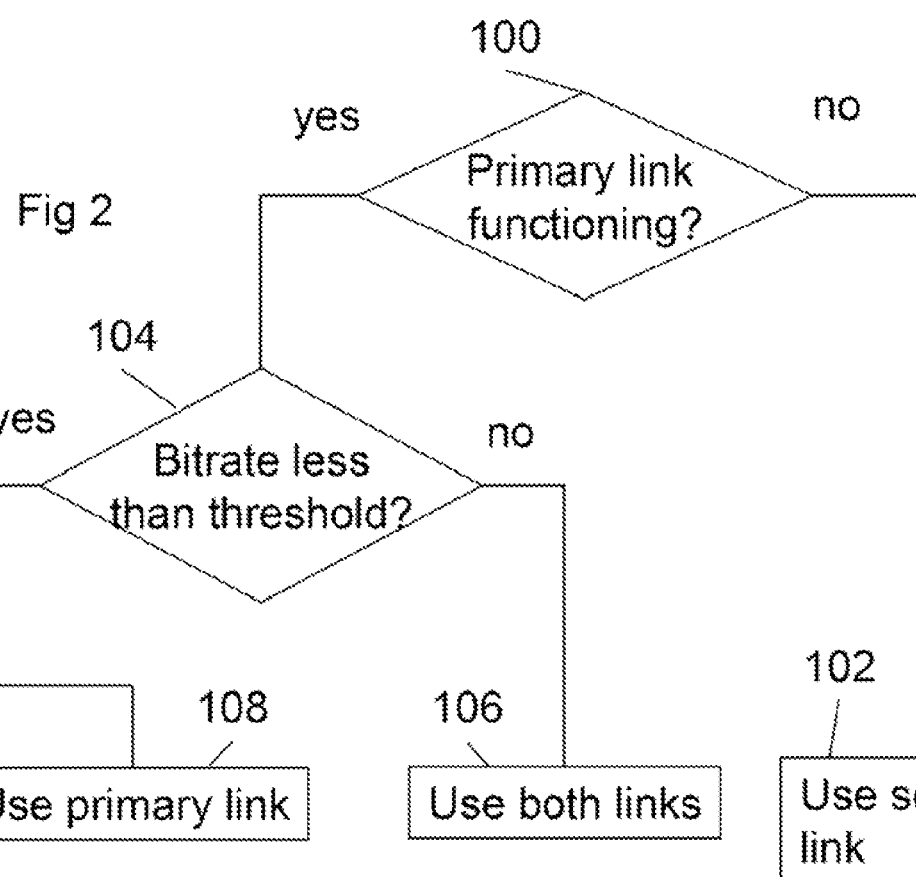
FIG. 2 shows a flow chart showing how data is assigned to the different links of FIG. 1.

Accordingly, the assignment of data between the differing connections can be demonstrated as illustrated in FIG. 2 of the accompanying drawings. When data is received at node A for node B, software running on a processor 10 within node A will assign data to the primary or secondary links 2, 3 using the method shown. The first step 100 is to determine whether the primary link is functioning correctly. If it is not, then all data will be sent by the secondary link at step 102. If the primary link is functioning, then the software determines at step 104 whether the bitrate of the data from node A for node B is greater than a threshold. If it is, then at step 106 both links will be used, whereas if not then only the primary link is used at step 108.

The invention claimed is:

1. A network comprising a plurality of nodes, the plurality of nodes comprising a first node and a second node, the first and second nodes being connected through the network of nodes via a first path and a second path, the first and second paths being different, in which the network has first and second modes of operation, a first mode in which traffic between the first and second nodes is transmitted over the first path and not the second path, and a second mode where the traffic is transmitted over the first and second paths, wherein the network comprises a mode selector arranged to select the mode of operation dependent upon a rate at which data to be transmitted to a destination node is received.

2. The network of claim 1, in which the second path comprises a protection path such that the network has a third mode of operation in which traffic between the first and second nodes is sent over only the second path, and in which the mode selector is arranged to select this mode should there be a fault on the first path.

3. The network of claim 1, in which the network further comprises a priority assignor, which is operable to assign a priority to the assignment of data between the first and second paths.

4. A network node for use in sending data to a destination node in a network, the network node comprising a first network interface and a second network interface, in which the network node has first and second modes of operation, a first mode in which the network node transmits data for the destination using the first network interface and not the second network interface, and a second mode where the data for the destination node is transmitted over the first and second network interfaces, wherein the network node comprises a mode selector arranged to select the mode of operation dependent upon a rate at which data to be transmitted to the destination node is received.

5. The network node of claim 4, in which the first network interface is connectable to a first path across the network to the destination node and the second network interface is connectable to a second path across the network to the destination node.

6. The network node of claim 4, in which the network node comprises a protection switch, whereby in case of a fault traffic for the destination node is sent via the second network interface should there be a fault on a link From the first interface to the destination node.

7. The network node of claim 4, in which the network node further comprises a priority assignor, which is operable to assign a priority to the assignment of data between the first and second paths.

8. A method of operating a network, the network comprising a plurality of nodes, the plurality of nodes comprising a first node and a second node, the first and second nodes being connected through the network of nodes via a first path and a second path, the first and second paths being different, the method comprising the operation of the network in first and second modes of operation, a first mode in which traffic between the first and second nodes is transmitted over the first path and not the second path, and a second mode where the traffic is transmitted over the first and second paths, and wherein the mode of operation is selected dependent upon a rate at which data to be transmitted to a destination node is received.

9. The method of claim 8, in which the second path comprises a protection path such that the network is operated in a third mode of operation in which traffic between the first and second nodes is sent over only the second path, and in which the third mode is selected should there be a fault on the first path.

10. The method of claim 8 in which the selection is made dependent upon whether the rate exceeds a threshold.

11. The method of claim 10, in which the threshold is a fraction of an available bandwidth of the first path.

12. The method of claim 8, in which the method comprises the step of assigning a priority to the assignment of data between the first and second paths.

13. The method of claim 12, in which data that is potentially to be routed onto the second path because of a failure in the network is assigned a higher priority than that assigned to data potentially to be assigned to the second path because of traffic levels.

14. A method of operating a network node so as to send data to a destination node in a network, the network node comprising a first network interface and a second network interface, in which the method comprises operating the network node in first and second modes of operation: a first mode in which the network node transmits data for the destination using the first network interface and not the second network interface, and a second mode where the data for the destination node is transmitted over the first and second network interfaces, and wherein the mode is selected dependent upon a rate at which data to be transmitted to a destination node is received.

* * * * *

UNITED STATES PATENT AND TRADEMARK OFFICE
CERTIFICATE OF CORRECTION

PATENT NO. : 9,253,078 B2  
APPLICATION NO. : 13/616521  
DATED : February 2, 2016  
INVENTOR(S) : Abbas Page 1 of 1

It is certified that error appears in the above-identified patent and that said Letters Patent is hereby corrected as shown below:

IN THE DRAWINGS

In Fig. 1, Sheet 1, delete "FIG" and insert -- FIG. --, therefor at each occurrence throughout the figures (Figs. 1 & 2).

IN THE SPECIFICATION

In Column 2, Line 17, delete "100%," and insert -- 100%. --, therefor.

In Column 3, Line 3, delete "1.00%." and insert -- 100%. --, therefor.

In Column 4, Line 36, delete "such," and insert -- such --, therefor.

IN THE CLAIMS

In Column 6, Line 41, in Claim 6, delete "From" and insert -- from --, therefor.

Signed and Sealed this  
Third Day of May, 2016

Michelle K. Lee  
*Director of the United States Patent and Trademark Office*